Figure 1:
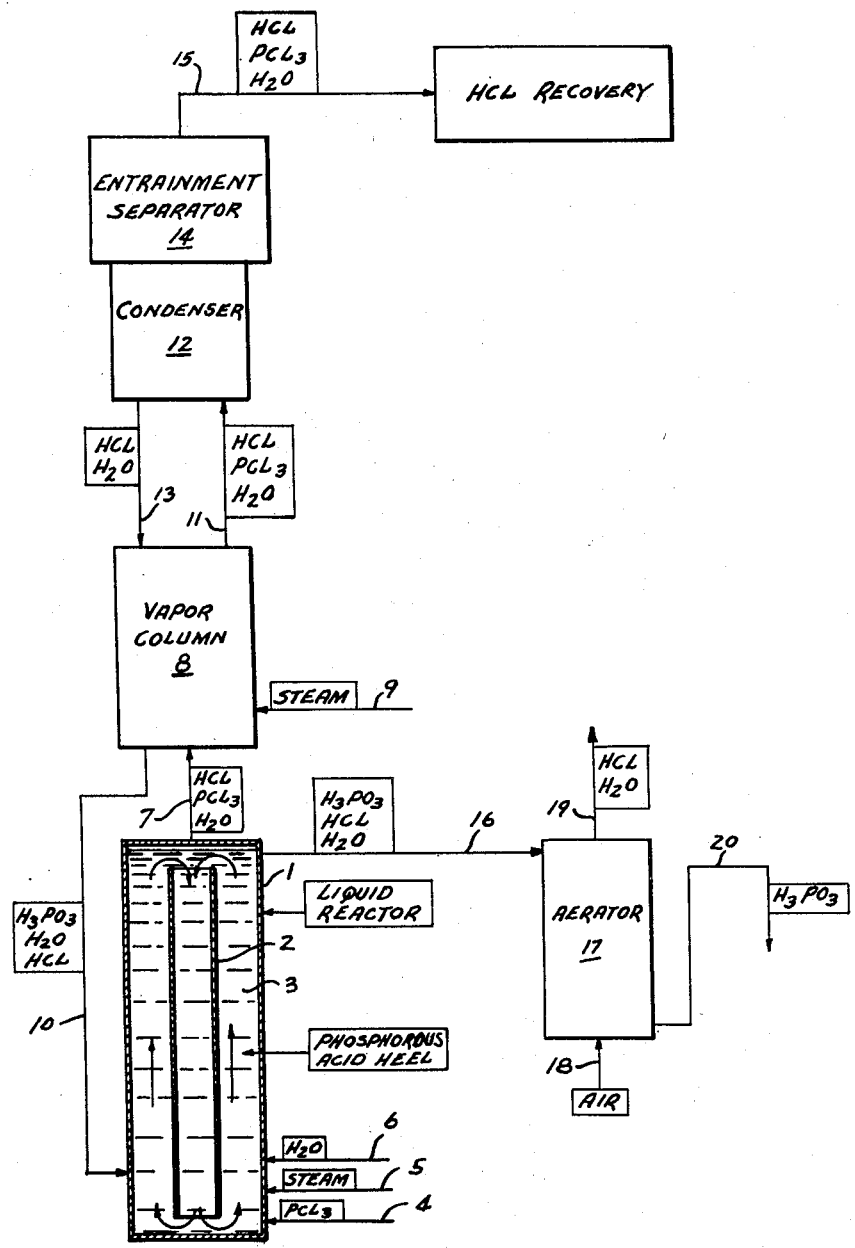

Feb. 23, 1954     O. C. JONES     2,670,274
METHOD OF PRODUCING ORTHO-PHOSPHORIC ACID
Filed Oct. 25, 1951     2 Sheets-Sheet 2

OTHA C. JONES
INVENTOR.

BY Elmer P. Rucker

ATTORNEY

Patented Feb. 23, 1954

2,670,274

UNITED STATES PATENT OFFICE 2,670,274

METHOD OF PRODUCING ORTHO-PHOSPHORIC ACID

Otha C. Jones, Campbell, Calif., assignor to Monsanto Chemical Company, St. Louis, Mo., a corporation of Delaware Application October 25, 1951, Serial No. 253,111

12 Claims. (Cl. 23—165)

This invention relates to phosphorous and phosphoric acids and to a novel and improved method of producing same.

An object of the invention is to provide a novel method of producing phosphorous and phosphoric acids, employing internal circulation whereby mechanical agitators and the attendant stuffing box problems are eliminated and the corrosion problems minimized.

Another object of the invention is to provide a method of producing phosphorous and phosphoric acids involving internal circulation whereby susbtantially improved production rates are obtainable over those of the prior art employing a non-circulating system.

Another object of the invention is to provide a method of making phosphorous and phosphoric acids in which the reaction temperature is more readily controlled than in methods not employing a circulating system.

A further object of the invention is to provide a method of making phosphorous and phosphoric acids in which a substantially constant product to feed ratio is maintained, thereby avoiding the formation of large excesses or stagnant pools of the reactants in the reaction medium.

A still further object of the invention is to provide an economically and commercially feasible method of making phosphorous and phosphoric acids involving internal or mechanical circulation of the reactants and reaction product with continuous recovery of the latter.

Other objects and advantages of the present invention will become apparent to those skilled in the art as the description proceeds.

It is known in the art that phosphorous and phosphoric acids can be produced by hydrolyzing phosphorous trihalides and phosphorus oxytrihalides, respectively. However, with one exception hereinafter discussed in detail, the methods involving the above raw materials have been restricted to laboratory use since they have a number of disadvantages which render them commercially unattractive. Most of these disadvantages are inherent in the prior art methods of producing both acids, but for purposes of convenience of description only, the general discussion of these advantages which immediately follows will be confined to the prior methods of producing phosphorous acid.

As indicated above, it is well known that phosphorus trichloride will react with water at low temperatures to form phosphorous acid, but as previously practiced this method results in substantial decomposition of the desired product and/or excessive loss of phosphorus trichloride by volatilization.

As a means of overcoming these disadvantages, it has been proposed to moderate the reaction by the combined use of low temperatures and a large excess of water. This approach substantially eliminates side reactions, excessive decomposition and loss of phosphorus trichloride by volatilization, but the use of a large excess of water yields dilute acid which must be concentrated if concentrated acid is desired. Moreover, this technique adds to the problem of removing hydrogen chloride from the phosphorous acid since the solubility of this impurity in the acid increases as the concentration of the water therein is increased.

As a modification of the foregoing method, it has been proposed to produce phosphorous acid by reacting trichloride with cold concentrated hydrochloric acid, the object being to avoid excessive dilution of the desired product. However, this method results in such excessive losses of phosphorus trichloride that the method is not economically or commercially practicable.

Another method which has been proposed is one involving the use of a packed tower containing a "heel" of phosphorous acid of at least 50% strength. In accordance therewith, phosphorus trichloride is introduced into a phosphorous acid "heel" under conditions resulting in hydrolysis of at least 66% of the phosphorus trichloride feed, the remaining unreacted PCl₃ which is volatilized with the by-product hydrogen chloride being conducted into the vapor section of the column where it meets a descending stream of water or phosphorous acid and is substantially completely converted to phosphorous acid. The undissolved hydrogen chloride and traces of phosphorus trichloride pass out of the top of the vapor section and the phosphorous acid formed therein flows into the heel, where the product is discharged as rapidly as it is produced in the tower. This method, which has enjoyed considerable commercial success, is disclosed and claimed in application Serial Number 51,194, filed in the name of John W. Lefforge et al., now Patent No. 2,595,198, issued April 29, 1952.

Notwithstanding the commercial success enjoyed by the method described and claimed in application Serial Number 51,194, it is subject to a number of rather serious disadvantages.

For example, when employing the foregoing method, it is very difficult to obtain optimum agitation and contacting of the reactants under conditions most suitable for the hydrolysis reaction. The reason for this is that the liquid heel of phosphorous acid can move only in a vertical direction in the column and consequently the gas lift produced by the volatilization of PCl₃ causes considerable pumping and "bumping" of the liquid.

Moreover, it is difficult, if not impossible, to effect satisfactory temperature control with the result that the temperature in the liquid section of the column varies within the limits of about 76° C. to about 200° C. Therefore, it is practically out of the question to maintain the hydrolysis temperature within 5° C. to 10° C. of the desired value.

In addition, it is practically impossible to maintain a substantially constant product to feed ratio since the concentration and temperature of the reaction medium, the agitation and contacting of the reactants, and the rate of hydrolysis vary widely throughout the liquid section of the column.

As a result of these difficulties, the above process requires very close attention in order to obtain reasonably smooth operation and a product which is uniform as to $H_3PO_3$ content. Even with very careful control, it is only possible to operate about 75% of the scheduled time and during this period, the capacity of the unit is only about 80% of what it should be since it is necessary to introduce the reactants at a relatively low feed rate.

I have developed a relatively simple, economically and commercially feasible method of effecting the hydrolysis of phosphorus trichloride and phosphorus oxychloride to phosphorous and phosphoric acid, respectively, in which the above difficulties and disadvantages have been eliminated or substantially reduced. This method comprises continuously feeding water and phosphorus trichloride or phosphorus oxytrichloride into a reaction zone containing a cyclically circulating stream of phosphorous or phosphoric acid, heating the circulating stream of acid to a temperature within the range of 75° C. to 200° C. or from 105° C. to 145° C. to hydrolyze from about 70% to about 98% of the incoming trichloride or oxytrichloride feed, respectively, and continuously withdrawing the resulting acid at a rate so correlated with the feed of the reactants as to maintain the reaction volume substantially constant.

More specifically, the above method involves the continuous introduction of phosphorus trichloride or oxytrichloride, water and steam into a tower reactor containing a cyclically circulating stream of phosphorous or phosphoric acid, heating the circulating stream of acid from 140° C. to 160° C. or from about 115° C. to 130° C. to hydrolyze from about 80% to about 90% of the trichloride or oxytrichloride feed, respectively, and then continuously withdrawing the resulting acid from the reactor as rapidly as it is formed. The gaseous product of the hydrolysis reaction including unreacted phosphorous trichloride or oxytrichloride, water vapor and hydrogen chloride is continuously introduced into another tower reactor where it is treated at a temperature in the range of 75° C. to 200° C. or about 85 to about 135° C. with water or steam to respectively convert its phosphorus trichloride or oxytrichloride content substantially completely into the corresponding acid.

The phosphorous or phosphoric acid produced in the above manner is continuously conveyed into an aerator where it is treated with preheated air or another inert gas until its hydrogen chloride content is reduced to less than 0.01%–0.1% and preferably less than 0.001% by weight. The product thus obtained consists of 70% to 100% $H_3PO_3$ or about 70% to 98% $H_3PO_4$.

In the above method the continuous flow of circulating phosphorous acid is maintained by mechanical or natural circulation, but the latter method is preferred since it eliminates the use of stuffing boxes which are required for agitator shafts or pump seals. Moreover, natural circulation minimizes the corrosion problem which is encountered in the use of metallic equipment.

Natural circulation within the meaning of the present specification contemplates the pumping action produced by the volatilization of the incoming feed and/or the gaseous by-product of the hydrolysis reaction. This pumping action may or may not be supplemented by temperature differences in the reactor system.

For a more complete understanding of the present invention, reference is made to the accompanying drawings in which Figure 1 illustrates the flow sheet of a typical method of practicing the instant invention which includes a diagrammatic vertical sectional view of the preferred form of liquid reactor.

Figure 2:
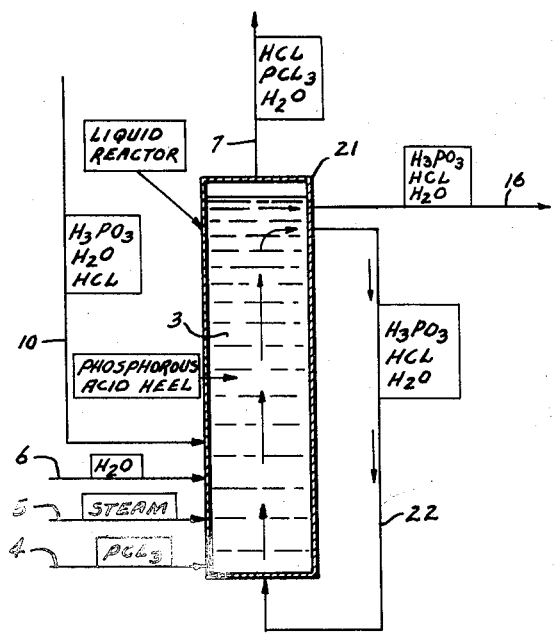

Figure 2 illustrates a modified form of liquid reactor which may be used in place of the one shown in Figure 1.

Referring more particularly to Figure 1, reference characters 1 and 2 represent two concentric glass or Karbate columns which constitute the liquid reactor wherein the major portion of the $PCl_3$-hydrolysis reaction takes place. The inner column 2 is supported in any suitable manner (not shown) in approximately the same relative position indicated in the drawing.

At the indicated points near the bottom of the liquid reactor, phosphorus trichloride, steam and liquid water are continuously introduced into a heel 3 of from 70% phosphorous acid to the equivalent of 108% phosphorous acid by way of lines 4, 5 and 6, respectively, the steam serving the dual purpose of supplying heat and part of the water for the hydrolysis reaction.

The introduction of the above materials into the heel of phosphorous acid brings about the continuous hydrolysis of the phosphorus trichloride to yield phosphorous acid, hydrogen chloride and unreacted phosphorus trichloride vapor. The gaseous products of this reaction produce a gas-lift which causes the phosphorous acid to continuously circulate in the manner illustrated by the arrows.

The hydrogen chloride, unreacted phosphorus trichloride and water vapor continuously leave the liquid reactor by line 7 and enter a vapor column 8 composed of glass or Karbate. Upon entering the vapor column, the above materials are continuously mixed with steam which is introduced by line 9. This brings about substantially complete hydrolysis of the phosphorus trichloride to form phosphorous acid containing small amounts of water and hydrogen chloride, which is continuously conveyed by line 10 to the liquid reactor where it is combined with the circulating stream of phosphorous acid.

The gaseous products of the reaction in the vapor column continuously leave by way of line 11 and enter a water-cooled condenser 12 where some of the water vapor and hydrogen chloride are condensed together and then permitted to flow continuously by line 13 back into the top of the vapor column.

The uncondensed phosphorous trichloride, hydrogen chloride and water vapor continuously pass into an entrainment separator 14 where further quantities of water and hydrogen chloride are separated and returned to the condenser 12 by any suitable means (not shown).

The unhydrolyzed phosphorus trichloride and the remaining water vapor and hydrogen chloride are continuously discharged from the system via line 15.

As the hydrolysis reaction proceeds, the phosphorous acid continuously accumulates in the liquid reactor and eventually flows by line 16 into an aerator 17, wherein hydrogen chloride and small amounts of water are continuously removed by air which enters the aerator by line 18 and leaves by line 19. After aeration, the phosphorous acid is discharged from the system in a continuous manner by line 20 and recovered as product.

Referring to Figure 2, reference character 21 represents a modified form of liquid reactor which may be used in place of the one described in Figure 1. This reactor is in the form of a glass or Karbate tower provided with a return line 22 which permits continuous circulation of the phosphorous acid by the gas lift produced as a result of the hydrolysis reaction.

The reference characters 3, 4, 5, 6, 7, 10 and 16 have the same significance as the corresponding characters in Figure 1.

The method of practicing the invention in the apparatus illustrated in Figure 2 is substantially identical with that described in connection with Figure 1 and hence a detailed description thereof is unnecessary. The only difference is that the liquid hydrolysis product (phosphorous acid) is continuously circulated from the top to the bottom of the reactor by return line 22, whereas in Figure 1 the circulation is effected in the concentric tubes 1 and 2, the course of the circulation being indicated by the arrows on the drawing.

The following examples illustrate in greater detail the method of practicing the instant invention:

Example I

Phosphorus trichloride, water and steam are continuously fed to a heel of 97.2% $H_3PO_3$ which is heated in the liquid reactor to a temperature of 100° C., the feed rates of the above materials being 126, 38.1 and 5.4 lbs. per hour respectively. After the hydrolysis reaction is initiated and equilibrium conditions are attained, the hydrolysis proceeds in a continuous manner at a temperature within the range of 140° C. to 160° C. This results in the production of phosphorous acid and a gaseous product including hydrogen chloride, water vapor and unreacted phosphorus trichloride to the extent of about 10% by weight of the $PCl_3$ charged to the liquid reactor. The gaseous product creates a gas lift or pumping action which causes the heel of phosphorous acid to rapidly circulate in the manner indicated in the drawing.

The hydrogen chloride, water vapor and unreacted phosphorus trichloride vapor continuously leave the liquid reactor and enter the vapor column at rates corresponding to 91.1, 2.4 and 12.6 lbs. per hour, respectively, where they are mixed with steam being fed into the vapor column at a rate of 10.9 lbs. per hour. This operation takes place at a temperature in the range of 110° C. to 135° C. and results in the hydrolysis of about 9% of the phosphorus trichloride originally charged to the liquid reactor.

The phosphorous acid, condensed water vapor and hydrogen chloride thus produced are continuously discharged from the vapor column and then introduced into the circulating heel of phosphorous acid at a rate corresponding to 6.7, 4.2 and 1.6 lbs. per hour, respectively.

The hydrolysis reaction in the vapor column yields hydrogen chloride, water vapor and phosphorus trichloride vapor as gaseous products and $H_3PO_3$ as liquid. The gaseous products are continuously discharged from the column and introduced into the condenser at rates corresponding to 101, 8.9 and 1.3 lbs. per hour, respectively. In the condenser and entrainment separator, water vapor and hydrogen chloride from the vapor column are condensed and continuously returned to the above column at a rate of 4.2 and 2.5 lbs. per hour, respectively.

The water vapor, hydrogen chloride and phosphorus trichloride which are not condensed in the condenser or entrainment separator are continuously discharged from the system at rates of 4.6, 98.6 and slightly less than 1.3 lbs. per hour, respectively.

The hydrolysis reaction in the liquid and vapor columns proceeds in a continuous manner with the result that phosphorous acid accumulates and continuously flows over into the aerator at the rate of 73.8 lbs. per hour. Simultaneously therewith, water and hydrogen chloride are conveyed into the aerator along with the phosphorous acid at flow rates equivalent to 1.5 and 0.6 lbs. per hour, respectively.

The phosphorous acid in the aerator is treated with air for a period of 5–10 minutes while heating same to a temperature of 150° C. This yields a product consisting of essentially 100% $H_3PO_3$ which contains less than 0.01% by weight of hydrogen chloride.

Example II

Phosphorus trichloride, steam and water are continuously charged to the liquid reactor (1, 2) containing a heel of 98.5% phosphorous acid which has been heated to 100° C., the charging rates being 30, 3 and 6 lbs. per hour, respectively. When equilibrium conditions are attained, the reaction temperature is about 150° C. and the degree of hydrolysis is substantially 89.5% of the phosphorus trichloride feed. As in the case of Example I, the gaseous hydrolysis product including hydrogen chloride, water vapor, and unreacted $PCl_3$ vapor creates a gas lift which causes the phosphorous acid heel to circulate in the reactor in the manner illustrated in Figure 1.

While the above reaction is taking place, saturated steam at 100° C. is continuously introduced into the vapor column at a rate of 3 lbs. per hour. The steam thus introduced is continuously mixed with the gaseous product from the liquid reactor and the hydrolysis of the unreacted $PCl_3$ is thereby carried substantially to completion, the hydrolysis reaction temperature being in the range of 110° C. to 135° C.

The phosphorous acid produced in the vapor column is continuously returned to the liquid reactor where it is combined with the circulating heel of phosphorous acid.

The phosphorous acid which accumulates in the liquid reactor overflows continuously into the aerator, where it is heated to 150° C. and then treated with air for about 5–10 minutes to yield a product equivalent to 100.44% $H_3PO_3$ which contains less than 0.001% HCl.

Example III

Phosphorus oxychloride, water and steam are continuously fed to a heel of 92% $H_3PO_4$ which is heated in the liquid reactor to a temperature of 130° C., the feed rates of the above materials being 140, 49 and 12 lbs. per hour, respectively. After the hydrolysis reaction is initiated and equilibrium conditions are attained, the hydrolysis proceeds in a continuous manner at the above temperature. This results in the production of phosphoric acid and a gaseous product including hydrogen chloride, water vapor and unreacted phosphorus oxychloride to the extent of about 26.7% of the $POCl_3$ charged to the liquid reactor. As in the phosphorous acid reaction, the gaseous product creates a gas lift or pumping action which causes the heel of phosphoric acid to rapidly circulate in the manner indicated for phosphorous acid in the drawing.

The hydrogen chloride, water vapor and unreacted phosphorus oxychloride vapor continuously leave the liquid reactor and enter the vapor column where they are mixed with steam being introduced into the vapor column at a rate of 12 lbs. per hour. This operation takes place at a temperature of about 110° C. and results in the hydrolysis of about 22% of the phosphorus oxychloride originally charged to the liquid reactor.

The phosphoric acid, condensed water vapor and a small portion of the hydrogen chloride produced as a result of the above hydrolysis are continuously discharged from the vapor column and then introduced into the circulating heel of phosphoric acid.

The hydrolysis reaction in the vapor column yields hydrogen chloride, water vapor and phosphorus oxychloride vapor as gaseous products and liquid phosphoric acid containing dissolved hydrogen chloride. These gaseous products are continuously discharged from the column and introduced into the condenser. In the condenser and entrainment separator, water vapor and a small portion of the hydrogen chloride from the vapor column are condensed and continuously returned to the above column.

The water vapor, hydrogen chloride and phosphorus oxychloride which are not condensed in the condenser or entrainment separator are continuously discharged from the system.

The hydrolysis reaction in the liquid and vapor columns proceeds in a continuous manner with the result that phosphoric acid containing hydrogen chloride accumulates and continuously flows into the aerator. The acid thus obtained is treated with preheated air for a period of about 20–25 minutes, the air entering at about 154° C. and leaving the aerator at about 77° C. This operation yields a product consisting of 92% $H_3PO_4$ which contains less than .02% by weight of hydrogen chloride.

The various conditions of operation of the present method will now be considered in detail.

In accordance with the present invention, the hydrolysis of the phosphorus trichloride is carried out at a temperature of at least 75° C. but below that temperature at which substantial decomposition of the trichloride into products other than phosphorous acid occurs. More specifically, the hydrolysis reaction is carried out at a temperature within the range of 75° C. to 190° C. and preferably within the range of 140° C. to 160° C.

In the case of phosphorus oxytrichloride, the hydrolysis is executed at a temperature of from about 105° C. to about 145° C. but slightly higher temperatures may be employed if desired. Within the above range, a hydrolysis temperature of about 115° C. to about 130° C. is preferred.

The $PCl_3$-hydrolysis reaction in the vapor column is carried out at a temperature in the range of 75° C. to 175° C. and within these limits, a temperature of from 110° C. to 135° C. is preferred. When the hydrolysis is effected by means of steam, the reaction temperature will generally be within the limits of 100° C. and 175° C., but at the point where the condensate from the condenser contacts the gaseous product from the vapor column the temperature will fall below 100° C. and may be as low as 75° C. While it is preferred to complete the hydrolysis of the phosphorus trichloride by means of steam, it is not essential to do so and, therefore, it is to be understood that the invention in its broader aspects contemplates the introduction of liquid water into the top of the vapor column to accomplish the above objective. In fact, in its broadest aspect, the invention contemplates the omission of the vapor column altogether.

The hydrolysis of $POCl_3$ in the vapor column is carried out at a temperature within the range of about 110° C. to about 125° C. Except for this modification the remarks made in the preceding paragraph are equally applicable to the above hydrolysis reaction.

The concentration of the phosphorous acid heel or reaction medium may be varied within the limits of from about 70% to the equivalent of 108% by weight of $H_3PO_3$ and within these limits a concentration of from 95% to 100% by weight is preferred.

In the production of phosphoric acid from $POCl_3$, the concentration of the heel or reaction medium may be varied within the range of from 70% to 98% by weight of $H_3PO_4$ and within these limits a concentration of from 80% to 95% by weight is preferred.

In carrying out the hydrolysis reaction, the reactants are employed in substantially the theoretical amounts required to convert the phosphorus oxytrihalide and phosphorus trihalide into the corresponding acids. However, the invention is not limited thereto as more than the theoretical amount of water may be used. In fact, in actual practice of the invention, up to 20% excess water is employed in order to make up for evaporation losses. The only limitation in this respect is that water should not be introduced in amounts such that the concentration of the reaction medium is reduced under equilibrium conditions to less than about 70% $H_3PO_3$ or $H_3PO_4$.

The feed rates of the phosphorus trichloride or phosphorus oxytrichloride and water are so correlated with respect to the concentration and temperature of the reaction medium (phosphorous or phosphoric acid heel) as to ensure hydrolysis in the liquid reactor of from about 70% to about 98% of the phosphorus trichloride or phosphorus oxytrichloride feed. However, it is preferred that the correlation of the above conditions be such that from 80% to 90% of the phosphorus trichloride or phosphorus oxytrichloride feed is hydrolyzed in the above reactor.

The feed rate of the water or steam to the vapor column is not critical. The only requirement here is that the feed rate be so correlated with that of the gaseous product coming from the liquid reactor as to substantially completely hydrolyze its $PCl_3$ content without permitting the reaction temperature to fall below 75° C. or to rise above 200° C. and preferably not above 150° C.

In the hydrolysis of $POCl_3$ in the vapor column, the correlation of the feed rate of the water or steam with the flow rate of the gaseous product coming from the liquid reactor must be such that the $POCl_3$ is substantially completely hydrolyzed without permitting the reaction temperature to fall below 105° C. or rise substantially above 145° C.

The crude phosphorous or phosphoric acid produced by the above method usually contains up to about 5% by weight of HCl depending upon the concentration of the above acids, temperature and time. The removal of this acid is achieved by heating the crude phosphorous acid or phosphoric acid under reduced pressure, by aeration or treatment with an inert gas.

For example, substantially complete removal of the HCl is effected by heating the crude phosphorous or phosphoric acid to a temperature of from 100° C. to 150° C. while under an absolute pressure of approximately 2–30 mm. of mercury. This may also be accomplished by aeration or treatment of the acid for 5 to 10 minutes with an inert gas, while heating the acid or gas to a temperature of 150° C. The product of these treatments contains less than 0.01%–0.02% by weight of HCl and may contain less than 0.001% HCl if they are carried on long enough.

The above described purification methods are merely illustrative of convenient techniques which may be employed and it is to be understood that any other HCl removal method which does not adversely affect the phosphorous or phosphoric acid is within the scope of the invention.

The preferred products prepared and purified in the above manner consist essentially of 95% to 100% $H_3PO_3$ and 90% to 98% $H_3PO_4$.

While in its broadest aspect, the present invention contemplates the production of acid containing as little as 70% $H_3PO_3$ or 70% $H_3PO_4$, it is preferred in practice to so proportion the reactants as to yield from 95% to 100% $H_3PO_3$ or from 90% to 98% $H_3PO_4$. However, in the case of phosphorous acid production, the invention is not limited to the foregoing conditions as the reactants may be so proportioned as to yield a mixture of phosphorous and pyrophosphorous acid having an iodine reducing power equivalent to 108% $H_3PO_3$.

The natural circulation method described in connection with the apparatus illustrated in Figures 1 and 2 presents a number of advantages over the non-circulating or countercurrent method described in the above-mentioned application of Lefforge et al. For example, the method of the instant invention makes possible greater ease of temperature control, smoother operation, more efficient mixing of the feed with the reaction medium, better heat transfer from the reaction medium to the reactants and a substantially increased production rate. More particularly, because of the above improvement involving natural circulation with concurrent flow of the reactants, the production of phosphorous acid and phosphoric acid can be carried out for more than 99% of the scheduled time; in addition, since the feed rates of the reactants can be substantially increased, the units of the instant invention can be operated at 100% capacity as compared with the 80% capacity of the countercurrent unit of the above application. Thus, it can be seen that the net effect of the above improvement is an overall increase in production rate of about 48%.

As indicated earlier herein, mechanical circulation may be used in place of natural circulation, but it is much less desirable since it involves the use of pumps, pump seals, agitator shafts and stuffing boxes, which are either subject to leakage or offer greater opportunities for corrosion to take place due to the corrosive nature of the $PCl_3$, $POCl_3$, HCl and $H_3PO_4$.

While it is preferred to construct the liquid and vapor columns of glass or Karbate, the invention is not limited thereto as other materials including Teflon, Haveg, etc. which are inert to $PCl_3$, $POCl_3$, HCl and $H_3PO_4$ may be used if desired.

Although the present description has been confined to the production of phosphorous acid and phosphoric acid by the hydrolysis of phosphorus trichloride and phosphorus oxytrichloride, respectively, it is to be understood that the present invention is not limited thereto as it is equally applicable to the hydrolysis of phosphorus tribromide and phosphorus oxytribromide.

Variations in the conditions under which the present method is operated, depending upon the nature and size of the equipment and the other factors involved, are contemplated as being within the scope of the present invention and the invention is not to be construed as being limited to the specific conditions or apparatus described in the examples except as defined in the appended claims.

Where reference is made in the specification and claims to heating to effect hydrolysis in the liquid or vapor column, it is to be understood that the heat involved is exothermic heat of reaction and also heat introduced by steam. However, it is also within the scope of the invention to supply external heat by means other than steam.

This application is a continuation-in-part of application Serial Number 179,014, filed August 12, 1950, in the name of Otha C. Jones, now abandoned.

What I claim is:

1. The method of continuously producing an acid selected from the group consisting of ortho-phosphoric and ortho-phosphorous acids by the hydrolysis of phosphorus oxytrihalide and phosphorus trihalide, respectively, which comprises continuously supplying both water and a compound selected from the group consisting of phosphorus oxytrihalide and phosphorus trihalide directly to the lower half of an elongated vertical column reactor containing a heel of said acid of at least 70% strength, said acid being cyclically circulated in a continuous stream of substantially constant composition from the bottom of said heel to substantially the top thereof, maintaining said cyclically circulating heel at a temperature of at least 75° C. to effect continuous hydrolysis of said phosphorus oxytrihalide and said phosphorus trihalide into said acid and a gaseous mixture including unconverted reactants and hydrogen halide, but below that temperature at which substantial decomposition of said phosphorus oxytrihalide and said phosphorus trihalide into products other than said acid and said gaseous mixture takes place, and continuously withdrawing the resulting acid at a rate so correlated with the feed as to maintain the volume of said acid heel substantially constant, said reactants being supplied to said reactor at a rate effecting continuous hydrolysis of from about 70% to about 98% by weight of said phosphorus oxytrihalide and said phosphorus trihalide, said phosphorus oxytrihalide and said phosphorus trihalide containing halogen atoms selected from the group consisting of chlorine and bromine, and said acid heel being cyclically circulated in the above-described manner by the pumping action produced by the volatilization of said gaseous mixture within said acid heel.

2. The method of continuously producing ortho-phosphoric acid, which comprises continuously supplying both water and a phosphorus oxytrihalide selected from the group consisting of phosphorus oxytrichloride and phosphorus oxytribromide directly to the lower half of an elongated vertical column reactor containing a heel of said acid of at least 70% strength, said acid heel being cyclically circulated in a continous stream of substantially constant composition from the bottom of said heel to substantially the top thereof, maintaining said cyclically circulating acid heel at a temperature of from about 105° C. to about 145° C. to effect continuous hydrolysis of said phosphorus oxytrihalide into phosphoric acid and a gaseous mixture including unconverted reactants and hydrogen halide, and continuously withdrawing the resulting acid at a rate so correlated with the feed as to maintain the volume of said acid heel substantially constant, said reactants being supplied to said reactor at a rate effecting continuous hydrolysis of from about 70% to about 98% by weight of said phosphorus oxytrihalide, and said acid heel being cyclically circulated in the above-described manner by the pumping action produced by the volatilization of said gaseous mixture within said acid heel.

3. The method of continuously producing ortho-phosphorous acid, which comprises continuously supplying both water and a trihalide selected from the group consisting of phosphorus trichloride and phosphorus tribromide directly to the lower half of an elongated vertical column reactor containing a heel of said acid of at least 70% strength, said acid heel being cyclically circulated in a continuous stream of substantially constant composition from the bottom of said heel to substantially the top thereof, maintaining said cyclically circulating acid heel at a temperature of at least about 75° C., but below that temperature at which substantial decomposition of said trihalide into products other than phosphorous acid and a gaseous mixture including unconverted reactants and hydrogen halide takes place, and thereby effecting continuous hydrolysis of said phosphorus trihalide into phosphorous acid and a gaseous mixture including unconverted reactants and hydrogen halide, and continuously withdrawing the resulting phosphorous acid at a rate so correlated with the feed as to maintain the volume of said acid heel substantially constant, said reactants being supplied to said reactor at a rate effecting continuous hydrolysis of from 70% to 98% by weight of said phosphorus trihalide, and said acid heel being cyclically circulated in the above-described manner by the pumping action produced by the volatilization of said gaseous mixture within said acid heel.

4. The method of continuously producing ortho-phosphorous acid, which comprises continuously supplying both water and phosphorus trichloride directly to the lower half of an elongated vertical column reactor containing a heel of at least 70% phosphorous acid, said acid heel being cyclically circulated in a continuous stream of substantially constant composition from the bottom of said heel to substantially the top thereof, maintaining said cyclically circulating acid heel at a temperature within the range of about 75° C. to about 200° C. and thereby effecting continuous hydrolysis of said phosphorus trichloride into phosphorous acid and a gaseous mixture including unconverted reactants and hydrogen chloride, and continuously withdrawing the resulting phosphorous acid from said reactor as rapidly as it is formed therein, said reactants being supplied to said reactor at a rate effecting hydrolysis of from 70% to 98% of the phosphorus trichloride supplied thereto, and said acid heel being cyclically circulated in the above-described manner by the pumping action produced by the volatilization of said gaseous mixture within said acid heel.

5. The method of continuously producing ortho-phosphorous acid, which comprises supplying both water and phosphorus trichloride directly to the lower half of an elongated vertical column reactor containing a heel of 70% to the equivalent of 108% $H_3PO_3$, said acid heel being cyclically circulated in a continuous stream of substantially constant composition from the bottom of said heel to substantially the top thereof, maintaining said cyclically circulating acid heel at a temperature within the range of about 75° C. to about 200° C. and thereby effecting continuous hydrolysis of said phosphorus trichloride into phosphorous acid and a gaseous mixture including unconverted reactants and hydrogen chloride, and continuously withdrawing the resulting phosphorous acid from said reactor as rapidly as it is formed therein, said reactants being supplied to said reactor at a rate effecting continuous hydrolysis of from 80% to 90% of the phosphorus trichloride supplied thereto, and said acid heel being cyclically circulated in the above-described manner by the pumping action produced by the volatilization of said gaseous mixture within said acid heel.

6. The method of continuously producing ortho-phosphorous acid, which comprises supplying both water and phosphorus trichloride directly to the lower half of an elongated vertical column reactor containing a heel of 70% to the equivalent of 108% $H_3PO_3$, said acid heel being cyclically circulated in a continuous stream of substantially constant composition from the bottom of said heel to substantially the top thereof, maintaining said cyclically circulating acid heel at a temperature within the range of about 140° C. to about 160° C. and thereby effecting continuous hydrolysis of said phosphorus trichloride into phosphorous acid and a gaseous mixture containing unconverted reactants and hydrogen chloride, and continuously withdrawing the resulting phosphorous acid from said reactor as rapidly as it is formed therein, said reactants being supplied to said reactor at a rate effecting continuous hydrolysis of from 80% to 90% of the phosphorus trichloride supplied thereto, and said acid heel being cyclically circulated in the above-described manner by the pumping action produced by the volatilization of said gaseous mixture within said acid heel.

7. The method of continuously producing ortho-phosphorous acid, which comprises supplying both water and phosphorus trichloride directly to the lower half of an elongated vertical column reactor containing a heel of phosphorous acid of 70% to the equivalent of 108% $H_3PO_3$, said acid heel being cyclically circulated in a continuous stream of substantially constant composition from the bottom of said heel to substantially the top thereof, maintaining said cyclically circulating acid heel at a temperature in the range of about 75° C. to about 200° C., and thereby effecting continuous hydrolysis of said phosphorus trichloride into phosphorous acid and a gaseous mixture including unreacted phosphorus trichloride, hydrogen chloride and water vapor, continuously adding water to said gaseous mixture, after separation of the latter from said acid heel, at a rate effecting substantially complete hydrolysis of said unreacted phosphorus trichloride while maintaining the hydrolysis reaction temperature within the limits of 75° C. to 200° C., and continuously recovering said phosphorous acid product as rapidly as it is formed, said first-mentioned reactants being supplied to said lower half of said reactor at a rate effecting continuous hydrolysis of from 70% to 98% of the trichloride supplied thereto, and said acid heel being cyclically circulated in the above-described manner by the pumping action produced by the volatilization of said gaseous mixture within said acid heel.

8. The method of continuously producing ortho-phosphorous acid, which comprises continuously supplying both water and phosphorus trichloride directly to the lower half of an elongated vertical column reactor containing a heel of phosphorous acid of 95%–100% strength, said acid heel being cyclically circulated in a continuous stream of substantially constant composition from the bottom of said heel to substantially the top thereof, maintaining said cyclically circulating acid heel at a temperature in the range of about 75° C. to about 175° C., and thereby effecting continuous hydrolysis of said phosphorus trichloride into phosphorous acid and gaseous mixture including unreacted phosphorus trichloride, hydrogen chloride and water vapor, continuously adding water to said gaseous mixture, after separation of the latter from said acid heel, at a rate effecting substantially complete hydrolysis of said unreacted phosphorus trichloride while maintaining the hydrolysis reaction temperature within the limits of 75° C. to 175° C., and continuously recovering said phosphorous acid product as rapidly as it is formed, said first-mentioned reactants being supplied to said lower half of said reactor at a rate effecting continuous hydrolysis of from 80% to 90% of the trichloride supplied thereto, and said acid heel being cyclically circulated in the above-described manner by the pumping action produced by the volatilization of said gaseous mixture within said acid heel.

9. The method of continuously producing ortho-phosphorous acid, which comprises continuously supplying both water and phosphorus trichloride directly to the lower half of an elongated vertical column reactor containing a heel of phosphorous acid of 95% to 100% strength, said acid heel being cyclically circulated in a continuous stream of substantially constant composition from the bottom of said heel to substantially the top thereof, maintaining said cyclically circulating acid heel at a temperature in the range of about 140° C. to about 160° C., and thereby effecting continuous hydrolysis of said phosphorus trichloride into phosphorous acid and a gaseous mixture including unreacted phosphorus trichloride, hydrogen chloride and water vapor, continuously adding water to said gaseous mixture, after separation of the latter from said acid heel, at a rate effecting substantially complete hydrolysis of said unreacted phosphorus trichloride while maintaining the hydrolysis reaction temperature within the limits of 110° C. to 135° C., and continuously recovering said phosphorous acid product as rapidly as it is formed, said first-mentioned reactants being supplied to said lower half of said reactor at a rate effecting continuous hydrolysis of from 80% to 90% of the trichloride supplied thereto, and said acid heel being cyclically circulated in the above-described manner by the pumping action produced by the volatilization of said gaseous mixture within said acid heel.

10. The method of continuously producing ortho-phosphorous acid, which comprises continuously supplying phosphorus trichloride, water and steam at rates of 126, 38.1 and 5.4 lbs. per hour, respectively, directly to the lower half of an elongated vertical column reactor containing a heel of 97.2% $H_3PO_3$, said acid heel being cyclically circulated in a continuous stream of substantially constant composition from the bottom of said heel to substantially the top thereof, maintaining said cyclically circulating acid heel at a temperature of 140° C. to 160° C., and thereby effecting continuous hydrolysis of said phosphorus trichloride into phosphorous acid and a gaseous mixture including unreacted phosphorus trichloride, hydrogen chloride and water vapor, continuously adding steam to said gaseous mixture at the rate of 10.9 lbs. per hour to continuously effect substantially complete hydrolysis of said unreacted phosphorus trichloride to phosphorous acid, and continuously recovering said phosphorous acid product, said acid heel being cyclically circulated in the above-described manner by the pumping action produced by the volatilization of said gaseous mixture within said acid heel.

11. The method defined in claim 10 wherein the recovered phosphorous acid is subjected to a dechlorination treatment to remove hydrogen chloride.

12. The method of continuously producing ortho-phosphorous acid, which comprises continuously supplying phosphorus trichloride, water and steam at rates of 30, 3 and 6 lbs. per hour, respectively, directly to the lower half of an elongated vertical column reactor containing a heel of 98.5% phosphorous acid, said acid heel being cyclically circulated in a continuous stream of substantially constant composition from the bottom of said heel to substantially the top thereof, maintaining said cyclically circulating acid heel at a temperature of about 150° C., and thereby effecting continuous hydrolysis of said phosphorus trichloride into phosphorous acid and a gaseous mixture including unreacted phosphorus trichloride, hydrogen chloride and water vapor, continuously adding steam to said gaseous product at the rate of 3 lbs. per hour to continuously effect substantially complete hydrolysis of said unreacted phosphorus trichloride to phosphorous acid and continuously recovering said phosphorous acid product, said acid heel being cyclically circulated in the above-described manner by the pumping action produced by the volatilization of said gaseous mixture within said acid heel.

OTHA C. JONES.

References Cited in the file of this patent

UNITED STATES PATENTS

| Number | Name | Date |
|---|---|---|
| 1,811,712 | Boyd | June 23, 1931 |
| 2,232,674 | Pyzel | Feb. 18, 1941 |
| 2,595,198 | Lefforge | Apr. 29, 1952 |

OTHER REFERENCES

J. W. Mellor, "Inorganic and Theoretical Chemistry," vol. 8, 1928, pages 900 and 1023, Longmans, Green & Co., N. Y.

Perry, Chemical Engineers Handbook, 2nd edition, 1941; page 1543.

Riegel, Chemical Machinery, Reinhold Pub. Co., N. Y., 1944; pages 229-233.